Figure 2:
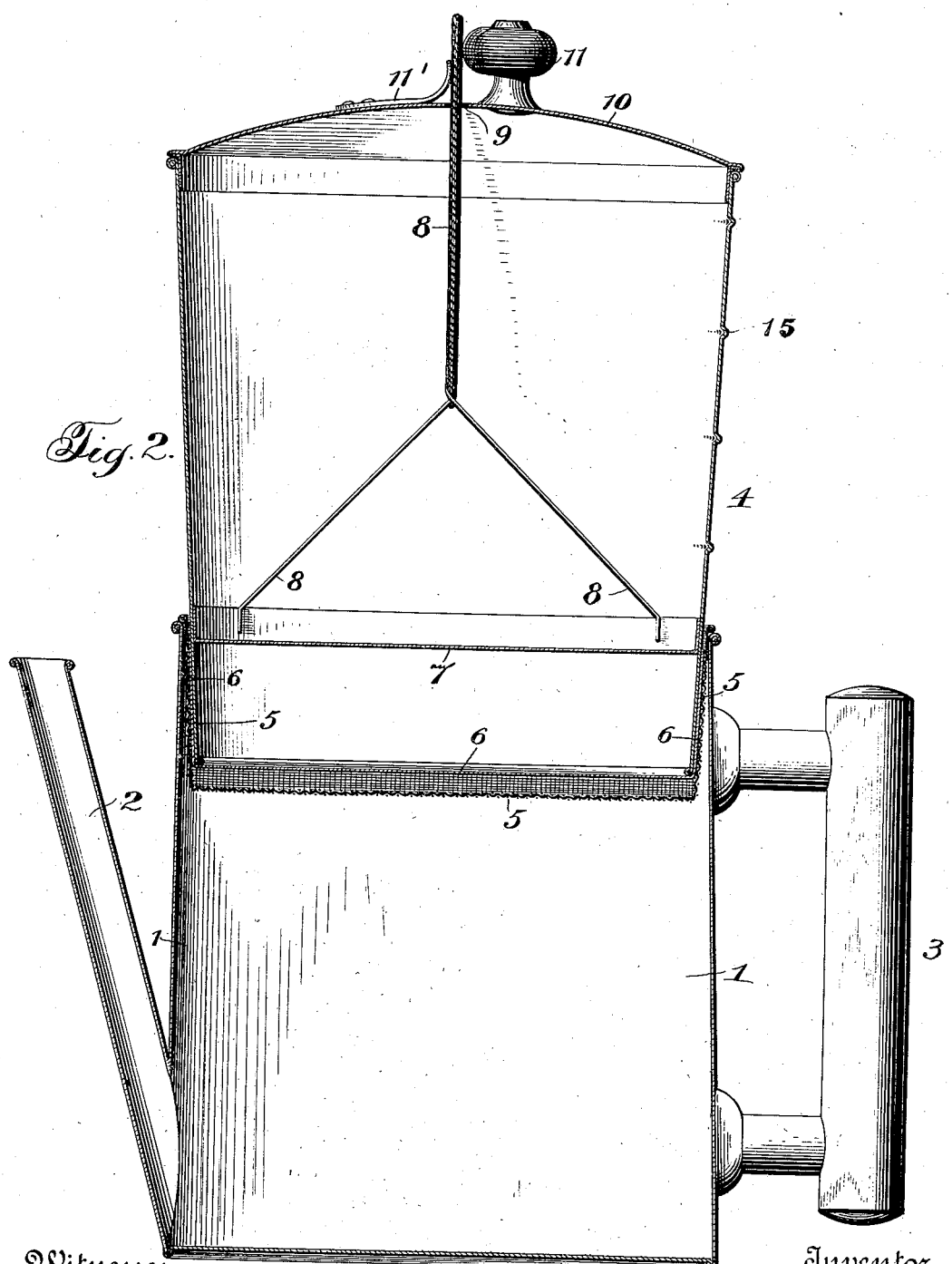

No. 891,441. PATENTED JUNE 23, 1908.
P. RENNER.
COFFEE POT.
APPLICATION FILED DEC. 20, 1906.
3 SHEETS—SHEET 1.
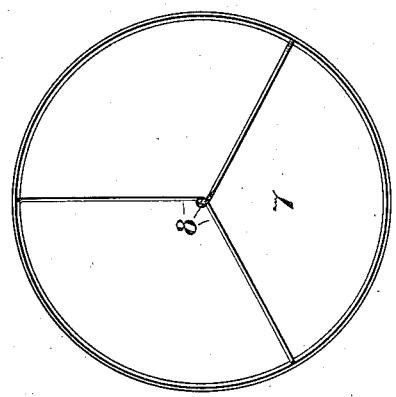
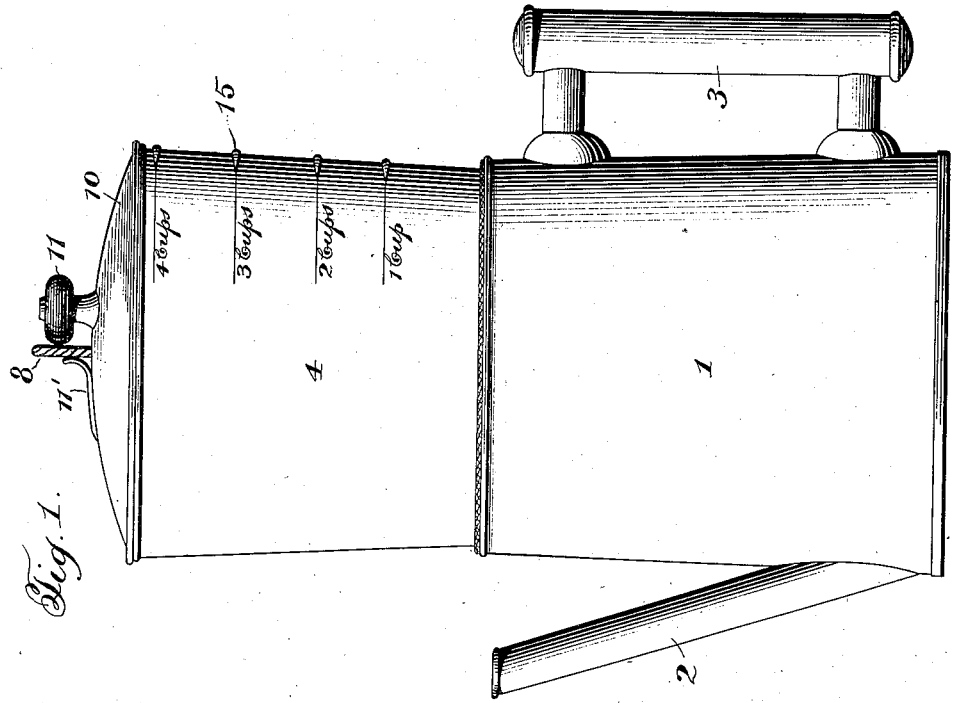
Witnesses
Jas E. Hutchinson
J. H. Reid
Inventor
Peter Renner
by
Attorney No. 891,441. PATENTED JUNE 23, 1908.
P. RENNER.
COFFEE POT.
APPLICATION FILED DEC. 20, 1906.

3 SHEETS—SHEET 2.

Witnesses
Jas. E. Hutchinson
J. H. Reid

Inventor
Peter Renner
by
Attorney

No. 891,441.
PATENTED JUNE 23, 1908.
P. RENNER.
COFFEE POT.
APPLICATION FILED DEC. 20, 1906.
3 SHEETS—SHEET 3.
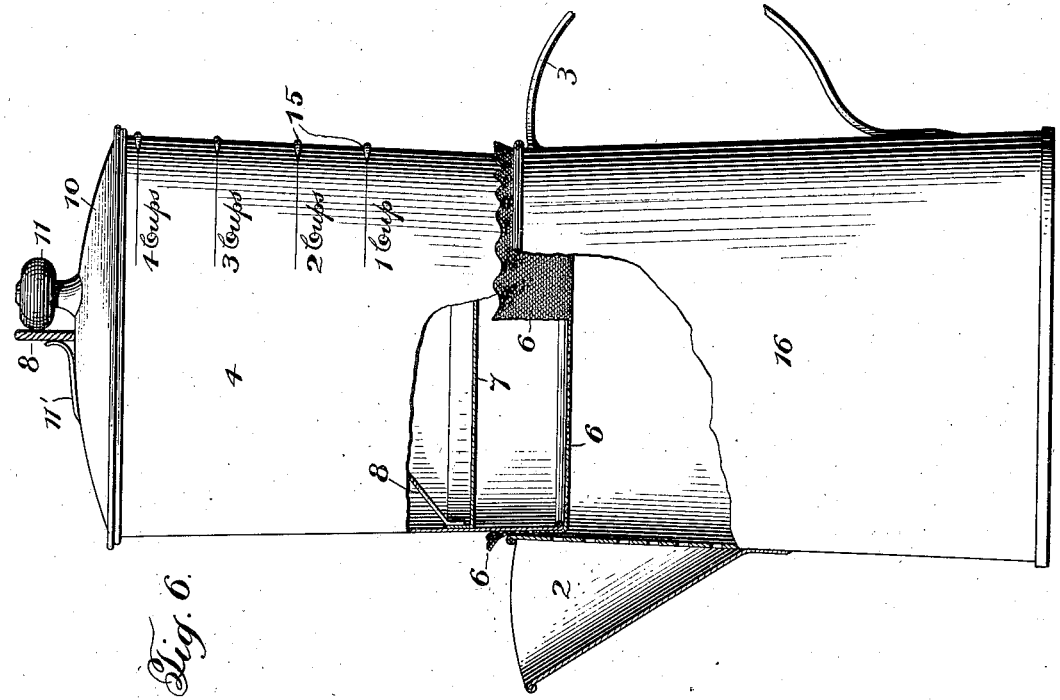
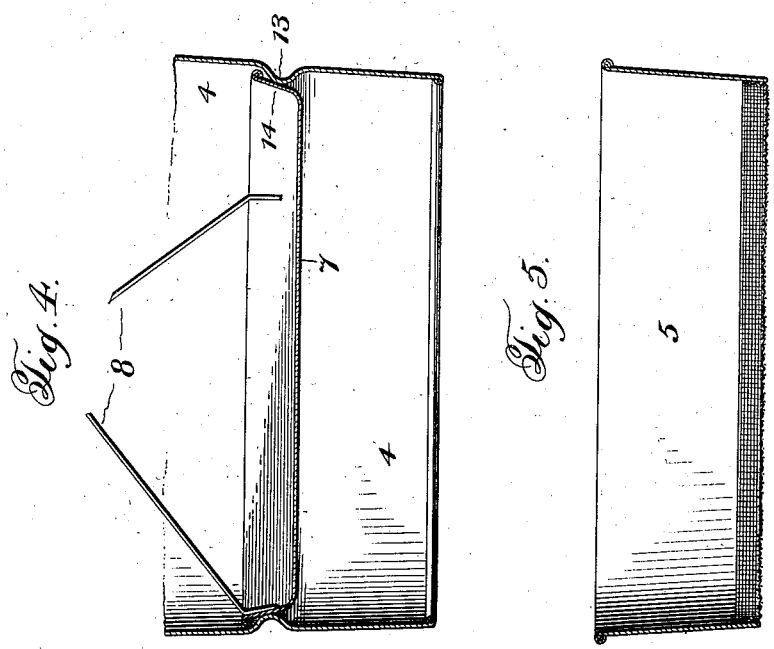
Witnesses:
Jas E. Hutchinson
J. H. Reid.
Inventor
Peter Renner
by
Attorney

UNITED STATES PATENT OFFICE.

PETER RENNER, OF CINCINNATI, OHIO.

COFFEE-POT.

No. 891,441.     Specification of Letters Patent.     Patented June 23, 1908.

Application filed December 20, 1906. Serial No. 348,781.

*To all whom it may concern:*

Be it known that I, PETER RENNER, a citizen of the United States, residing at Cincinnati, in the county of Hamilton and State of Ohio, have invented certain new and useful Improvements in Coffee-Pots; and I do hereby declare the following to be a full, clear, and exact description of the invention, such as will enable others skilled in the art to which it appertains to make and use the same.

This invention relates to improvements in pots for the production of infusible beverages, especially coffee, and more particularly relates to pots of that type commonly termed "drip" pots.

The object of the present invention is to provide a pot of the character mentioned the construction of which is such that the beverage, ready for serving, may be produced in an expeditious manner and without the presence therein of the grounds incident to infusion; and, moreover, the invention further aims to provide a pot by which the beverage may be made in immediate successive quantities without the necessity of separating the sections of the pot for cleansing.

A further object of the present invention is the provision of a mixer for beverages capable of use with pots of the usual form, thus rendering it possible to convert the ordinary pot of commerce into a pot of the "drip" type with but slight expense, and without the necessity of altering the construction of the ordinary pot.

With these general objects in view, and others which will appear as the nature of the improvements is better understood, the invention consists substantially in the novel construction, combination and arrangement of parts hereinafter described, illustrated in the accompanying drawings, and pointed out in the appended claims.

In the drawings—Figure 1 is a side elevation of a pot constructed in accordance with the present invention. Fig. 2 is a vertical transverse sectional view thereof. Fig. 3 is a top plan view of the removable bottom of the mixer section. Fig. 4 is a fragmentary transverse sectional view illustrating a modified construction. Fig. 5 is a transverse sectional view of another form of supporting basket. Fig. 6 is a vertical transverse sectional view illustrating the use of the mixer section with the ordinary pot of commerce.

Referring in detail to the drawings, the numeral 1 designates the container section of the herein-described pot, said section being provided with a pouring spout 2 and a handle 3, as in the construction of pot commonly employed.

Associated with the container section 1 is a mixer section 4, said section being arranged in superimposed relation to the container section 1 and tapering slightly from the top to its bottom. This permits the diameter of the mixer section to slightly decrease in a downward direction for a purpose to be presently stated. It will be observed that the lower end of the mixer section 4 projects into the top of the container section to a slight extent, and interposed between the lower end of the mixer section 4 and the upper end of the container section 1 is a supporting basket 5 formed preferably of wire fabric of large mesh. This basket may be formed entirely of wire fabric, or, in lieu thereof, it may be formed as shown in Fig. 5, in which view it will be seen that the sides are imperforate, being made preferably of tin, the bottom being formed of wire fabric suitably secured to the sides. The basket 5 fits snugly within the upper end of the container section 1, while the lower end of the mixer section 4 fits snugly within the basket 5, and a strainer 6, formed preferably of textile material, such as muslin, envelops the lower end of the section 4 to prevent the grounds passing into the container section, as will be presently explained. It will be noted that the strainer 6 is of such size that its edges do not project beyond the edges of the supporting basket 5 and the sides of the section 4, being concealed thereby, but the dimensions of the strainer are such that when the lower end of the section 4 has been inserted into the basket 5 the strainer 6 will be drawn taut over the lower end of the section 4. While the strainer 6 has been described as of textile material, such as muslin, it is manifest that wire fabric of very fine mesh may be substituted therefor, thus dispensing with the use of textile material.

The mixer section 4 is provided with a removable bottom 7, which bottom is in the form of a shallow cup, and the sides of said bottom are tapered to conform to the tapering sides of the sections 4, so that when the bottom 7 is moved, to a point within the section 4 corresponding in diameter substantially to the diameter of said bottom, the sides of the latter will snugly fit against the sides of the section 4 and close communication between the interior of said section and the container section 1.

An operating bar 8 is employed for moving the bottom 7, said bar being formed of a plurality of wires, preferably three, twisted together, the lower ends of said wires diverging and being connected to the sides of the bottom 7 at spaced intervals, as by soldering, or in an equivalent manner. The bar 8 passes through a centrally-disposed aperture 9 formed in a removable cover 10, which serves to close the upper end of the mixer section 4, which cover is provided with a handle knob 11, or its equivalent, for removing and replacing the cover, and arranged upon the cover 10 is a resilient retarder 11' in the form of a leaf spring. One end of the retarder 11' is soldered, or otherwise suitably connected to the cover 10, while the other end, which is free, bears against the bar 8, and by reason of its resiliency serves to hold the bar 8 in the positions to which it is adjusted when the bottom 7 has been moved to and from its seat within the mixer section 4.

In Fig. 4 is illustrated another form of the invention. This form, however, is, in the main, precisely the same as in the other views, but it will be noted that the section 4 is provided with an annular bead or indentation 13, upon which the removable bottom 7 is seated when in its closed position. In this case, however, the sides 14 of the bottom 7 have a greater inclination than that of the sides of the bottom in the other form, thus permitting the section to be readily seated upon the bead 13 when forced to its closed position, and establishing a perfectly tight joint between the bottom and said bead to preclude the liquid mixture passing downwardly to the container section until the removable bottom has been displaced from the bead.

The mixer section 4 is also provided with a series of graduations 15 in the form of beads and lines, which graduations indicate in cups, pints, or quarts, as may be desired, the points to which the section 4 may be supplied with boiling water for the production of a determinate amount of the beverage.

Fig. 6 discloses the use of the mixer section 4 with the ordinary pot of commerce, the latter being designated by the numeral 16. When used in this relation the ordinary pots of commerce may be readily converted into drip pots, it being merely necessary to accommodate the mixer section 4 to pots of proper size, and to this end the mixer section may be made in sizes to correspond with the ordinary size of commercial pots. When used in this relation, the strainer 6 is employed with the mixer section to free the grounds from the liquid when infusion has taken place, and by merely increasing the size of the strainer 6 so that the edges thereof may project beyond the edges of the pot 16, and the sides of the section 4, the use of the supporting basket 5 may be dispensed with.

In the use of the herein-described pot, the parts are assembled as illustrated in Fig. 2, in which figure it will be noted that the strainer 6 is drawn across the lower end of the mixer section 4 and supported within the basket 5, which latter in turn is supported within the container section 1. Pulverized or finely ground coffee having been placed within the mixer section 4 in a suitable quantity, the position of the bottom 7 being such as to prevent communication from the interior of the section 4 above the bottom with the interior of the container section 1, boiling water is introduced to the mixer section through the top thereof, and the combined mixture of coffee and water is permitted to stand for a short period, say, for approximately one-half or three-quarters of a minute. This enables the water to extract the strength of the coffee, and after lapse of the period referred to pressure is applied to the operating bar 8 in an upward direction, whereupon the movable bottom 7 moves upwardly from engagement with the tapering sides of the mixer section 4 and establishes communication between the interior of said section and the container section 1. The infusion is thus permitted to pass down between the sides of the bottom 7 and the sides of the section 4 upon the strainer 6, at which point the grounds are effectually separated from the liquid, and the latter passes down into the container section 1, the mesh of the basket 5 being large in order to permit free passage of the liquid, from which section it may be poured through the spout 2. After the beverage thus produced has been removed from the container section 1, it is possible to prepare a new infusion without the necessity of separating the parts, it being merely necessary to again seat the bottom 7 upon the sides of the mixer section 4 to cut off communication from the interior thereof with the container section 1, whereupon, after the introduction of an additional amount of the pulverized or finely ground coffee and the addition of a suitable quantity of boiling water, a like operation is repeated, after the mixture of the coffee with the water, and the coffee, prepared for serving, may be drawn from the container section 1, as before described.

In separating the parts, the mixer section 4 is first removed, leaving the strainer 6 in the supporting basket 5, and through the medium of the latter, it is apparent that the strainer 6 will still be prevented falling into the container section 1, or dumping the grounds into the clear coffee therein, and manifestly in removing the supporting basket 5 from the container section 1, the strainer 6 will be simultaneously removed therewith.

It will be apparent that the herein-described invention may also be employed as a tea-pot, and in producing the same, any suitable material may be employed, such as tin, aluminum, granite or enameled ware.

Having thus described the invention, what is claimed as new, and desired to be secured by Letters Patent, is:—

1. In a pot of the class described, a container section, a mixer section associated therewith, an imperforate bottom arranged in said mixer section and tightly engaging the sides of the mixer section, whereby the beverage during infusion is prevented passing from the mixer section to the container section, said bottom being movable from said engaged position to establish communication between the interior of the mixer section and the container section, and means for holding said bottom in said displaced position.

2. In a pot of the class described, a container section, a mixer section associated therewith and provided with tapering sides, an imperforate bottom arranged in said mixer section having tapering sides that tightly fit the tapering sides of the mixer section, whereby communication between the interior of the mixer section and the interior of the container section is cut off, means for moving said bottom from engagement with the sides of the mixer section to establish communication between the interior of the mixer section and the interior of the container section, and means for holding said bottom in said position.

3. In a pot of the class described, a container section, a mixer section associated therewith and provided with tapering sides, an imperforate movable bottom arranged in said mixer section having tapering sides that tightly fit the tapering sides of the mixer section, whereby communication between the interior of the mixer section and the interior of the container section is cut off, an operating bar connected to said bottom for moving the latter from engagement with the sides of the mixer section to establish communication between the interior of the mixer section and the interior of the container section, and means for engaging said bar to hold said bottom in said position.

4. In a pot of the class described, a container section, a mixer section associated therewith and provided with tapering sides, an imperforate movable bottom arranged in said mixer section having tapering sides that tightly fit the tapering sides of the mixer section, whereby communication between the interior of the mixer section and the interior of the container section is cut off, an operating bar connected to said bottom for moving the latter from engagement with the sides of the mixer section to establish communication between the interior of the mixer section and the interior of the container section, and a retarder coacting with said bar for holding said bottom in said position.

5. In a pot of the class described, a container section, a mixer section associated therewith and provided with tapering sides, an imperforate movable bottom arranged in said mixer section having tapering sides that tightly fit the tapering sides of the mixer section, whereby communication between the interior of the mixer section and the interior of the container section is cut off, an operating bar connected to said bottom for moving the latter from engagement with the sides of the mixer section to establish communication between the interior of the mixer section and the interior of the container section, and a resilient retarder coacting with said bar for holding said bottom in said position.

6. In a pot of the class described, a container section, a mixer section associated therewith, an imperforate bottom arranged in said mixer section and tightly engaging the sides of the mixer section, whereby the beverage during infusion is prevented passing from the mixer section to the container section, said bottom being movable from said engaged position to establish communication between the interior of the mixer section and the container section, means for holding said bottom in said displaced position, a supporting basket arranged between the mixer section and the container section, and a strainer supported by said basket and arranged over the mixer section for freeing the grounds from the liquid as the infusion passes from the mixer section to the container section.

7. In a pot of the class described, a container section, a mixer section associated therewith, an imperforate bottom arranged in said mixer section and tightly engaging the sides of the mixer section, whereby the beverage during infusion is prevented passing from the mixer section to the container section, said bottom being movable from said engaged position to establish communication between the interior of the mixer section and the container section, an operating bar for actuating said bottom, said bar comprising a plurality of wires twisted together, the inner extremities of said wires diverging and being connected to the movable bottom, and means coöperating with said bar for holding said bottom in said displaced position.

8. A mixing device for infusible beverages comprising a body provided with tapering sides, an imperforate movable bottom arranged in said body and also provided with tapering sides that tightly fit the sides of said body to prevent the mixture passing therefrom, and means for actuating said bottom to release the latter from engagement with the body and thereby to discharge the infusion from said body.

9. A mixing device for infusible beverages, comprising a body, an imperforate bottom arranged therein and movable to tightly fit the sides of the body for preventing the mixture passing therefrom, an operating bar connected to said bottom to actuate the latter for releasing the bottom from engagement with the body and thereby permitting discharge of the infusion, and means coöperating with said bar to hold the same in the position to which it has been moved in operating the bottom to permit the discharge of the infusion.

10. A mixing device for infusible beverages, comprising a body, an imperforate bottom arranged therein and movable to tightly fit the sides of the body for preventing the mixture passing therefrom, an operating bar connected to said bottom to actuate the latter for releasing the bottom from engagement with the body and thereby permitting discharge of the infusion, and a resilient retarder coöperating with said bar for holding the bottom in the position to which it is moved to permit the discharge of the infusion from the body.

In testimony whereof I affix my signature, in the presence of two witnesses.

PETER RENNER.

Witnesses:
 ROY MANOGUE,
 WM. D. ALEXANDER.